(12) United States Patent
Fritzke et al.

(10) Patent No.: US 12,736,678 B2
(45) Date of Patent: Sep. 15, 2026

(54) METROLOGY SUPPORTED TOMOGRAPHY SYSTEM AND METHODS OF USE

(71) Applicant: The Boeing Company, Arlington, VA (US)

(72) Inventors: Ricardo Andreas Fritzke, Sammamish, WA (US); Christopher Robert Brown, Seattle, WA (US); Hong Hue Tat, Redmond, WA (US); Christina Issa Fraij, Everett, WA (US); Brian J. Smith, Seattle, WA (US); Carl Jason Franklin, Seattle, WA (US); Tyler Myo Hein Ho, Bellevue, WA (US); Shane Edward Arthur, Kirkland, WA (US)

(73) Assignee: The Boeing Company, Arlington, VA (US)

( * ) Notice: Subject to any disclaimer, the term of this patent is extended or adjusted under 35 U.S.C. 154(b) by 646 days.

(21) Appl. No.: 18/313,322

(22) Filed: May 6, 2023

(65) Prior Publication Data

US 2024/0369710 A1 Nov. 7, 2024

(51) Int. Cl.

*G01S 17/66* (2006.01)
*G01N 23/046* (2018.01)
*G01S 7/481* (2006.01)
*G01S 17/06* (2006.01)
*G01S 17/89* (2020.01)
*G06T 7/00* (2017.01)

(52) U.S. Cl.

CPC ............ *G01S 17/66* (2013.01); *G01N 23/046* (2013.01); *G01S 7/4814* (2013.01); *G01S 17/06* (2013.01); *G01S 17/89* (2013.01); *G06T 7/0004* (2013.01); *G06T 2207/10116* (2013.01); *G06T 2207/30164* (2013.01)

(58) Field of Classification Search

None

See application file for complete search history.

(56) References Cited

U.S. PATENT DOCUMENTS 10,952,688 B2 * 3/2021 Rakic .................... A61B 6/032
2006/0254358 A1 * 11/2006 Merkel ................. G01N 29/07 73/601
2020/0141884 A1 5/2020 Goto et al.

(Continued)

OTHER PUBLICATIONS

"RadalyX—Robotic X-ray Imaging System (RTG)," Radalytica, Copyright 2020, accessed May 6, 2023, 5 pages.https://www.radalytica.com/en/robotic-imaging-system.html.

(Continued)

*Primary Examiner* — Hovhannes Baghdasaryan
(74) *Attorney, Agent, or Firm* — Yee & Associates, P.C.

(57) ABSTRACT

Metrology supported tomography systems and methods of use are presented. A metrology supported tomography system comprises an imaging system comprising a radiation source and a radiation detector; an independent tracking system comprising a first tracking target connected to the radiation source and a second tracking target connected to the radiation detector; and a tomography computation program configured to create a three-dimensional reconstruction utilizing data from the imaging system in combination with locations of the first tracking target and the second tracking target determined by the independent tracking system.

22 Claims, 7 Drawing Sheets

(56) References Cited

U.S. PATENT DOCUMENTS

| | | | | |
|---|---|---|---|---|
| 2022/0048199 | A1* | 2/2022 | Heidemann | G06T 7/73 |
| 2023/0008222 | A1* | 1/2023 | O'Connor | A61B 34/25 |
| 2023/0263488 | A1* | 8/2023 | van Kampen | A61B 6/44 378/19 |

OTHER PUBLICATIONS

Extended European Search Report, dated Jul. 22, 2024, regarding EP Application No. 24158566.0, 8 pages.

European Patent Office Action, dated Jan. 7, 2026, regarding EPO Application No. 24158566.0.

* cited by examiner

800
AIRCRAFT
802
AIRFRAME
INTERIOR
806
SYSTEMS
PROPULSION SYSTEM
ELECTRICAL SYSTEM
808
812
810
814
804
HYDRAULIC SYSTEM
ENVIRONMENTAL SYSTEM

METROLOGY SUPPORTED TOMOGRAPHY SYSTEM AND METHODS OF USE

BACKGROUND INFORMATION

1. Field

The present disclosure relates generally to inspection and more specifically to computed tomography scanning for large workpieces.

2. Background

Computed tomography scanning is used to provide non-destructive inspections. In performing computed tomography scanning, imaging data from a plurality of views of a workpiece is combined to create a three-dimensional view. To generate the imaging data from the plurality of views, one of the imaging system or the workpiece is moved.

One form of conventional CT scanning system includes an imaging system that rotates around a restricted volume. Due to the boundaries of the restricted volume, the workpiece size is limited. Workpieces too large for the restricted volume cannot be inspected.

Therefore, it would be desirable to have a method and apparatus that takes into account at least some of the issues discussed above, as well as other possible issues.

SUMMARY

An embodiment of the present disclosure provides a metrology supported tomography system. The metrology supported tomography system comprises a radiation source connected to a first movement system, a first tracking target connected to the radiation source, a radiation detector connected to a second movement system, a second tracking target connected to the radiation detector, and an independent tracking system configured to track locations of the first tracking target and the second tracking target.

Another embodiment of the present disclosure provides a metrology supported tomography system. The metrology supported tomography system comprises an imaging system comprising a radiation source and a radiation detector, an independent tracking system comprising a first tracking target connected to the radiation source and a second tracking target connected to the radiation detector, and a tomography computation program configured to create a three-dimensional reconstruction utilizing data from the imaging system in combination with locations of the first tracking target and the second tracking target determined by the independent tracking system.

Yet another embodiment of the present disclosure provides a method of inspecting a workpiece. A plurality of images of the workpiece is generated using an imaging system comprising a radiation source and a radiation detector. Source locations for the radiation source and detector locations for the radiation detector are determined when each of the plurality of images is generated. A three-dimensional reconstruction is created utilizing the plurality of images from the imaging system, the source locations, and the detector locations.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative examples recognize and take into account one or more different considerations. For example, the illustrative examples recognize and take into account that in current assembly of aircraft structures, large structures have limited options for gap inspection.

The illustrative examples recognize and take into account that currently, potential gaps in large structures are addressed through at least one of predictive shimming, feeler gages, or through-hole laser measurement systems. Predictive shimming predicts gaps based on measurement of parts prior to assembly. Any shape changes in the parts induced in assembly are not measured using predictive shimming.

The illustrative examples recognize and take into account that feeler gages are a manual process of inserting shims of increasing size into panel interfaces and holes. The process of using feeler gauges is time consuming, and only provides information at accessible locations. Manual measurements using feeler gages can only be done in accessible areas, such as part edges and hole locations. Feeler gages are only able to provide limited information on gaps between panels.

The illustrative examples recognize and take into account that through-hole laser measurement systems can be automated or manual, and are quicker than using feeler gages. However, through-hole laser measurement systems are only able to measure gaps at hole locations.

The illustrative examples provide metrology supported tomography systems that can be used to inspect large workpieces. The metrology supported tomography systems can be used to inspect workpieces that are oversized and cannot fit within a restricted volume of a conventional CT scanning system.

Utilizing a metrology tracking system to provide location data for inspection equipment enables tomographic scanning of large workpieces without a full 360-degree rotation. Utilizing a metrology tracking system to provide location data for inspection equipment allows for tomographic scanning of large workpieces with a scan angle of less than 180 degrees.

Figure 1:
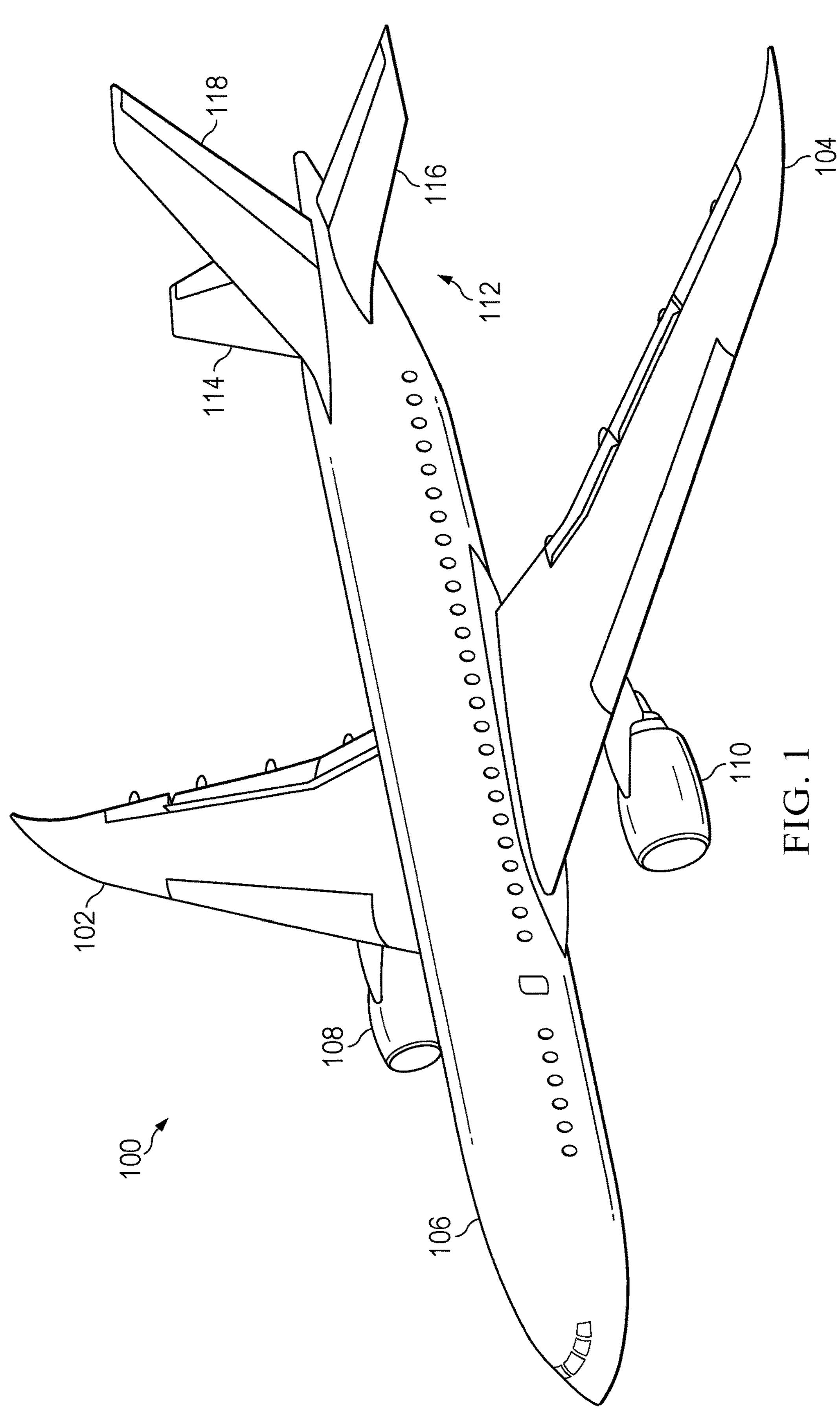
FIG. 1 is an illustration of an aircraft in accordance with an illustrative embodiment.

Turning now to FIG. 1, an illustration of an aircraft is depicted in accordance with an illustrative embodiment. Aircraft 100 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

Aircraft 100 is an example of an aircraft that can have portions inspected using a metrology supported tomography system. For example, a portion of wing 104 or wing 102 can be inspected using a metrology supported tomography system.

Figure 2:
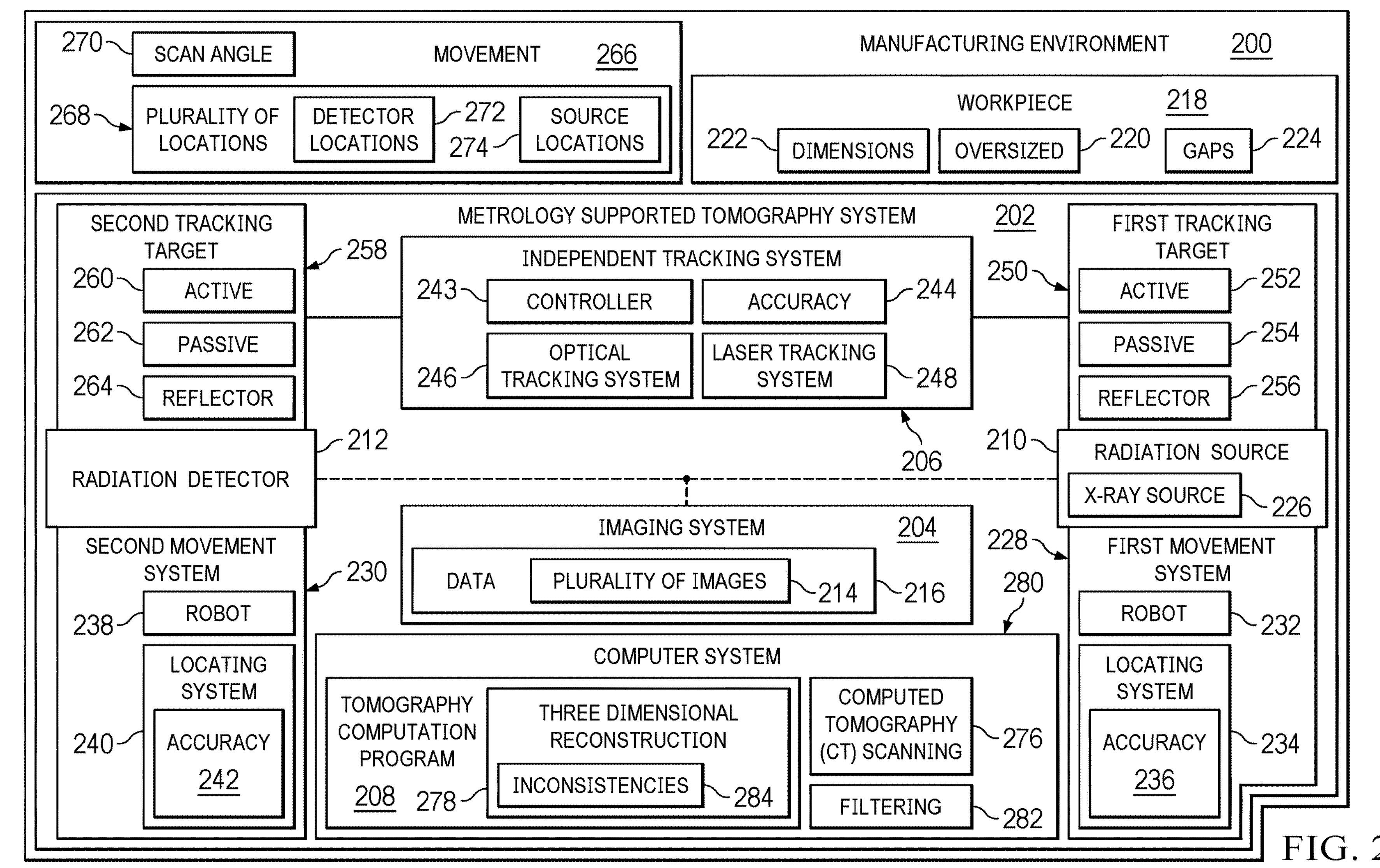
FIG. 2 is an illustration of a block diagram of a manufacturing environment in accordance with an illustrative embodiment.

Turning now to FIG. 2, an illustration of a block diagram of a manufacturing environment is depicted in accordance with an illustrative embodiment. Portions of aircraft 100 can be manufactured in a manufacturing environment 200. Workpiece 218 can be a portion of at least one of wing 102, wing 104, or body 106 of FIG. 1.

Metrology supported tomography system 202 is present in manufacturing environment 200 to inspect workpiece 218. Workpiece 218 has dimensions 222 that prohibit workpiece 218 from being inspected in a conventional CT scanner. Workpiece 218 is referred to as oversized 220 due to at least one of dimensions 222 being too large to fit within a conventional CT scanner configured to operate around a restricted volume or dimensions 222 being too large for radiation source 210 and radiation detector 212 being unable to rotate 360 degrees around workpiece 218. Metrology supported tomography system 202 can be used to detect and locate gaps 224 in workpiece 218. Metrology supported tomography system 202 provides more information on locations of gaps 224, depths, and geometries in workpiece 218 than a typical manual measurement.

Metrology supported tomography system 202 comprises imaging system 204, independent tracking system 206, and tomography computation program 208. Imaging system 204 comprises radiation source 210 and radiation detector 212. Independent tracking system 206 comprises first tracking target 250 connected to radiation source 210 and second tracking target 258 connected to radiation detector 212. Tomography computation program 208 is configured to create three-dimensional reconstruction 278 utilizing data 216 from imaging system 204 in combination with plurality of locations 268 of first tracking target 250 and second tracking target 258 determined by the independent tracking system 206. Tomography computation program 208 is configured to utilize locations tracked by independent tracking system 206 during formation of three-dimensional reconstruction 278 comprising data from radiation detector 212.

As depicted, computer system 280 in manufacturing environment creates three-dimensional reconstruction 278 using tomography computation program 208. Computer system 280 can be in communication with imaging system 204 and independent tracking system 206 in any desirable fashion, such as through wired communication or wireless communication. In some illustrative examples, computer system 280 comprises a wireless communication device (not depicted) that receives data 216 to create three-dimensional reconstruction 278.

Three-dimensional reconstruction 278 can also be referred to as a CT image or a three-dimensional image. Three-dimensional reconstruction 278 is the result of applying tomographic algorithms such as filtered back projection to the data with the positional information from the metrology system.

To generate three-dimensional reconstruction 278, accurate knowledge of geometry of imaging system 204 is used. Algorithms are used to combine geometry determined from independent tracking system 206 and plurality of images 214.

Radiation source 210 is a sufficiently powerful radiation source to inspect workpiece 218. For example, when workpiece 218 is a portion of a wing of an aircraft, radiation source 210 is sufficiently powerful to inspect joints within the portion of the wing.

In some illustrative examples, due to the size and weight of radiation source 210 having sufficient power to inspect workpiece 218, first movement system 228 is a larger and more robust movement system than those used in conventional inspection systems. In some illustrative examples, movement system 228 has at least one of larger joints, stronger motors, or any other desirable reinforcement to support and move radiation source 210.

In some illustrative examples, first movement system 228 is a larger and more robust movement system than those used in conventional inspection systems due to dimensions 222 of workpiece 218. In some illustrative examples, first movement system 228 is a larger and more robust movement system due to the size of workpiece 218.

As depicted, radiation source 210 is connected to first movement system 228. First movement system 228 connected to radiation source 210 takes any desirable form. In some illustrative examples, first movement system 228 takes the form of robot 232. In some illustrative examples, first movement system 228 is a robotic arm.

First movement system 228 has locating system 234 that first movement system 228 uses in tracking a position of first movement system 228 within manufacturing environment 200. In some illustrative examples, locating system 234 of first movement system 228 tracks movement of first movement system 228 in manufacturing environment 200.

In some illustrative examples, locating system 234 comprises position sensors. In some illustrative examples, locating system 234 comprises encoders to track movement of motors used to drive first movement system 228. Locating system 234 can be described as using predicted positions based on the use of encoders to track movement.

Accuracy of independent tracking system 206 is greater than an accuracy of respective locating systems of first movement system 228 and second movement system 230. Accuracy 236 of locating system 234 is insufficient for performing computed tomography (CT) scanning 276 with workpiece 218 having dimensions 222. Accuracy 236 of locating system 234 is insufficient for performing computed tomography (CT) scanning 276 to locate gaps 224. Accuracy 236 of locating system 234 is insufficient for performing tomography computation program 208 to measure desired inconsistencies. Utilizing locating system 234 to form a three-dimensional reconstruction would result in a three-dimensional reconstruction too blurry to determine inconsistencies of a desired size. Accuracy 236 of locating system 234 is insufficient for performing tomography computation program 208 to measure inconsistencies 284.

Accuracy 236 of locating system 234 is sufficient for positioning radiation source 210. Locating system 234 is utilized by first movement system 228 during movement 266.

As depicted, radiation detector 212 is connected to second movement system 230. Second movement system 230 connected to radiation detector 212 takes any desirable form. In some illustrative examples, second movement system 230 takes the form of robot 238. In some illustrative examples, second movement system 230 is a robotic arm.

Second movement system 230 has locating system 240 that second movement system 230 uses in tracking a position of second movement system 230 within manufacturing environment 200. In some illustrative examples, locating system 240 of second movement system 230 tracks movement of second movement system 230 in manufacturing environment 200.

In some illustrative examples, locating system 240 comprises position sensors. In some illustrative examples, locating system 240 comprises encoders to track movement of motors used to drive second movement system 230. Locating system 240 can be described as using predicted positions based on the use of encoders to track movement.

Accuracy 242 of locating system 240 is insufficient for performing computed tomography (CT) scanning 276 with workpiece 218 having dimensions 222. Accuracy 242 of locating system 240 is insufficient for performing tomography computation program 208 with scan angle 270 less than 180 degrees. Accuracy 242 of locating system 240 is insufficient for performing computed tomography (CT) scanning 276 to locate gaps 224. Accuracy 242 of locating system 240 is insufficient for performing tomography computation program 208 to measure desired inconsistencies. Utilizing locating system 240 to form a three-dimensional reconstruction would result in a three-dimensional reconstruction too blurry to determine inconsistencies of a desired size. Accuracy 242 of locating system 240 is insufficient for performing tomography computation program 208 to measure inconsistencies 284.

Accuracy 242 of locating system 240 is sufficient for positioning radiation detector 212. Locating system 240 is utilized by second movement system 230 during movement 266.

To inspect workpiece 218 for gaps 224 using metrology supported tomography system 202, imaging system 204 is moved relative to workpiece 218 to generate plurality of images 214. Components of imaging system 204 undergo movement 266 relative to workpiece 218 to generate data 216. Movement 266 includes at least one of linear movement or rotation. More specifically, radiation source 210 and radiation detector 212 of imaging system 204 undergo movement 266 around workpiece 218 through scan angle 270. In some illustrative examples, each of radiation source 210 and radiation detector 212 of imaging system 204 undergo movement 266 around workpiece 218 through less than 180 degrees.

Imaging system 204 is any desirable type of imaging system having radiation source 210. In some illustrative examples, imaging system 204 is a neutron imaging system for neutron tomography. In some illustrative examples, imaging system 204 is an X-ray imaging system and radiation source 210 is X-ray source 226. Radiation source 210 is moved in a path relative to workpiece 218 while radiation detector 212 is moved relative to workpiece 218 to receive radiation from radiation source 210. The path can take any desirable form. In some illustrative examples, the path in some illustrative examples, radiation source 210 is moved in an arc relative to workpiece 218 while radiation detector 212 is moved relative to workpiece 218 to receive radiation from radiation source 210.

In some illustrative examples, moving radiation source 210 in a path comprises moving radiation source 210 through scan angle 270 of up to 120 degrees. In some illustrative examples, moving radiation source 210 in a path comprises moving radiation source 210 through scan angle 270 of up to 180 degrees.

As radiation source 210 is moved within manufacturing environment 200, first tracking target 250 connected to radiation source 210 also moves within manufacturing environment 200. In some illustrative examples, first tracking target 250 is directly connected to radiation source 210. In other illustrative examples, first tracking target 250 is indirectly connected to radiation source 210. When first tracking target 250 is indirectly connected to radiation source 210, first tracking target 250 is connected to radiation source 210 through any desirable quantity of items. Radiation source 210 is connected to first tracking target 250 such that movement of first tracking target 250 is the same as movement of radiation source 210 within manufacturing environment 200.

As radiation detector 212 is moved within manufacturing environment 200, second tracking target 258 connected to radiation source 210 also moves within manufacturing environment 200. In some illustrative examples, second tracking target 258 is directly connected to radiation detector 212. In other illustrative examples, second tracking target 258 is indirectly connected to radiation detector 212. When second tracking target 258 is indirectly connected to radiation detector 212, second tracking target 258 is connected to radiation detector 212 through any desirable quantity of items. Radiation detector 212 is connected to second tracking target 258 such that movement of second tracking target 258 is the same as movement of radiation detector 212 within manufacturing environment 200.

By identifying a location of first tracking target 250 within manufacturing environment 200, a location of radiation source 210 within manufacturing environment 200 can be determined. By identifying a location of second tracking target 258 within manufacturing environment 200, a location of radiation detector 212 within manufacturing environment 200 can be determined.

Independent tracking system 206 comprises controller 243, first tracking target 250, and second tracking target 258. First tracking target 250 can be passive 254 or active 252. When first tracking target 250 is passive 254, first tracking target 250 does not transmit information. When first tracking target 250 is active 252, first tracking target 250 transmits data. First tracking target 250 can take any form, such as, an optical target, an RFID tag, a Wi-Fi transmitter, reflector 256 or any other desirable type of target.

Second tracking target 258 can be passive 262 or active 260. When second tracking target 258 is passive 262, second tracking target 258 does not transmit information. When second tracking target 258 is active 260, first tracking target 250 transmits data. Second tracking target 258 can take any form, such as, an optical target, an RFID tag, a Wi-Fi transmitter, reflector 256 or any other desirable type of target.

A type of first tracking target 250 and a type of second tracking target 258 are selected based on a type of independent tracking system 206. A type of independent tracking system 206 is selected to provide accuracy 244 sufficient to perform tomography computation program 208 using data 216.

In some illustrative examples, independent tracking system 206 takes the form of optical tracking system 246. In some illustrative examples, independent tracking system 206 takes the form of laser tracking system 248. In some illustrative examples, independent tracking system 206 takes the form of laser tracking system 248, first tracking target 250 comprises reflector 256, and second tracking target 258 comprises reflector 264.

Controller 243 contains any desirable hardware to track first tracking target 250 and second tracking target 258, such as transmitters and receivers. In some illustrative examples, controller 243 comprises a laser energy source. In these illustrative examples, first tracking target 250 reflects the laser energy back to controller 243. In these illustrative examples, second tracking target 258 reflects laser energy back to controller 243.

Independent tracking system 206 determines plurality of locations 268 of first tracking target 250 and second tracking target 258. In some illustrative examples, plurality of locations 268 can be used to determine detector locations 272 of radiation detector 212 during inspection of workpiece 218. In some illustrative examples, plurality of locations 268 can be used to determine source locations 274 of radiation source 210 during inspection of workpiece 218.

Tomography computation program 208 utilizes data from independent tracking system 206 in combining data 216 from imaging system 204 to form a three-dimensional image referred to as three-dimensional reconstruction 278. In some illustrative examples, detector locations 272 and source locations 274 determined from independent tracking system 206 are utilized in constructing three-dimensional reconstruction 278 from data 216 from imaging system 204.

In some illustrative examples, to generate three-dimensional reconstruction 278 using data 216 with scan angle 270 less than 360 degrees, filtering 282 is performed to increase differentiation of gaps 224 from other materials of workpiece 218 in three-dimensional reconstruction 278. In some illustrative examples, to generate three-dimensional reconstruction 278 using data 216 with scan angle 270 less than 360 degrees, filtering 282 is performed to reduce noise. In some illustrative examples, filtering 282 comprises applying edge enhancing filters.

Inconsistencies 284 within three-dimensional reconstruction 278 are representative of inconsistencies, such as gaps 224, in workpiece 218. In some illustrative examples, inconsistencies 284 include at least one of a difference in color or intensity of pixels from expected pixel values for material within a joint. Three-dimensional reconstruction 278 is analyzed to locate inconsistencies 284. Locating inconsistencies 284 within three-dimensional reconstruction 278 is performed to identify gaps 224 in workpiece 218.

The illustration of manufacturing environment 200 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, in some illustrative examples, independent tracking system 206 can take the form of any desirable tracking system having sufficient accuracy. In some illustrative examples, independent tracking system 206 can take the form of an RFID system.

Figure 3:
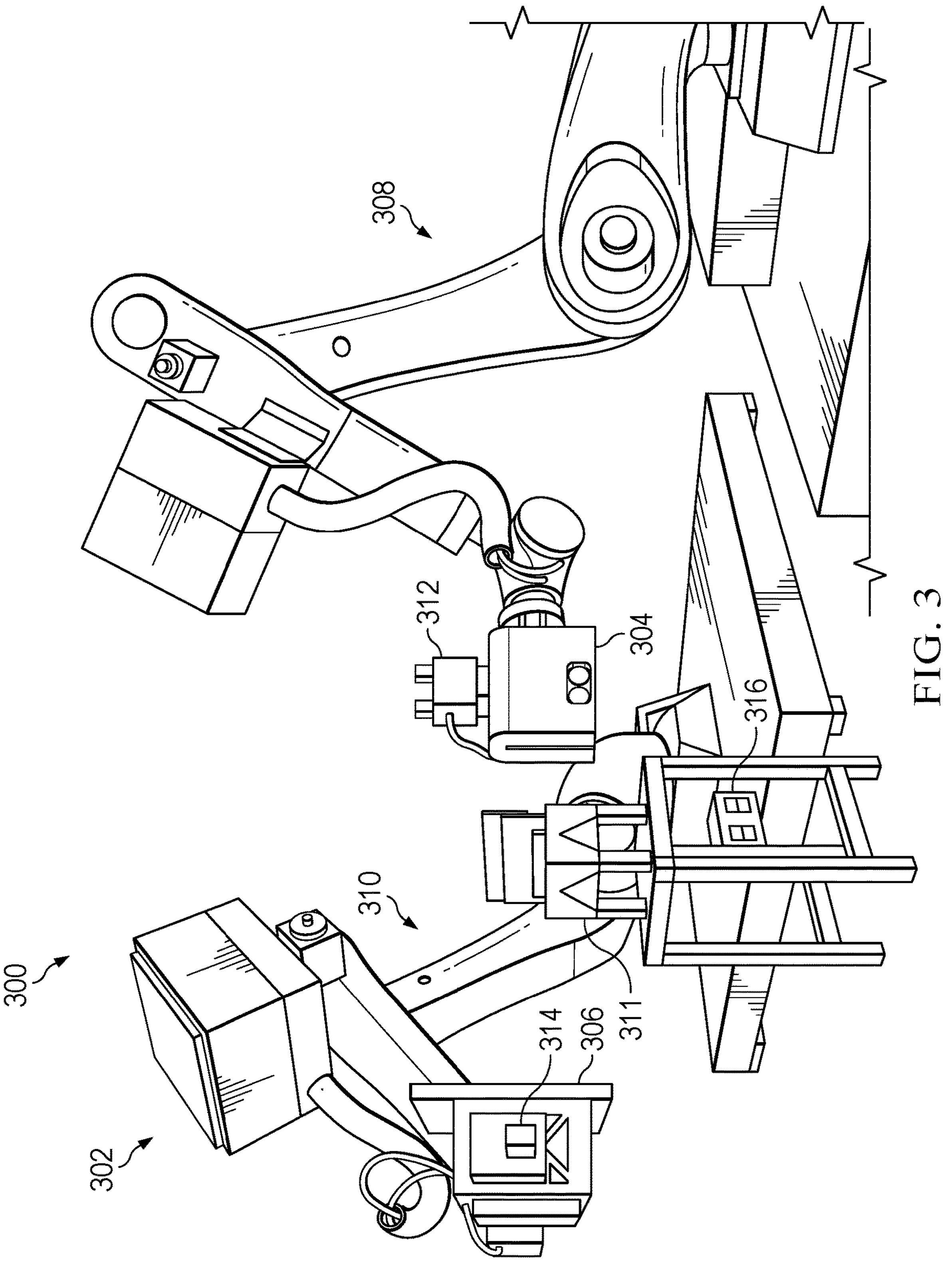
FIG. 3 is an illustration of a metrology supported tomography system in accordance with an illustrative embodiment.

Turning now to FIG. 3, an illustration of a metrology supported tomography system is depicted in accordance with an illustrative embodiment. Manufacturing environment 300 contains metrology supported tomography system 302. Metrology supported tomography system 302 comprises radiation source 304 and radiation detector 306. Radiation source 304 is connected to first movement system 308. In this illustrative example, first movement system 308 takes the form of a robotic arm. Radiation detector 306 is connected to second movement system 310. In this illustrative example, second movement system 310 takes the form of a robotic arm. Although each of first movement system 308 and second movement system 310 each include a respective locating system to track the location of the respective movement system within manufacturing environment 300, data from the locating systems of first movement system 308 and second movement system 310 are not used to perform computed tomography scanning using Metrology supported tomography system 302.

For example, although first movement system 308 has a locating system (not visible) to track movements of first movement system 308 to determine a position of first movement system 308 within manufacturing environment 300, this locating system is not used to perform computed tomography scanning using metrology supported tomography system 302. The locating system of first movement system 308 is used to drive and track first movement system 308 during inspection using radiation source 304. However, a location of radiation source 304 for inspection using computed tomography scanning is determined independently of the locating system of first movement system 308.

Independent tracking system 311 is used to determine locations of radiation source 304 and radiation detector 306 within manufacturing environment 300. Data from independent tracking system 311 is used to determine positional data for generating a three-dimensional reconstruction for computed tomography scanning. Independent tracking system 311 comprises first tracking target 312 connected to radiation source 304, second tracking target 314 connected to radiation detector 306, and controller 316.

In some illustrative examples, independent tracking system 311 is a laser tracking system. In some illustrative examples, when independent tracking system 311 is a laser tracking system, controller 316 takes the form of a laser source and a laser detector. In some illustrative examples, independent tracking system 311 is an optical tracking system. In some illustrative examples, when independent tracking system 311 is an optical tracking system, controller 316 takes the form of a directable camera.

Figure 4:
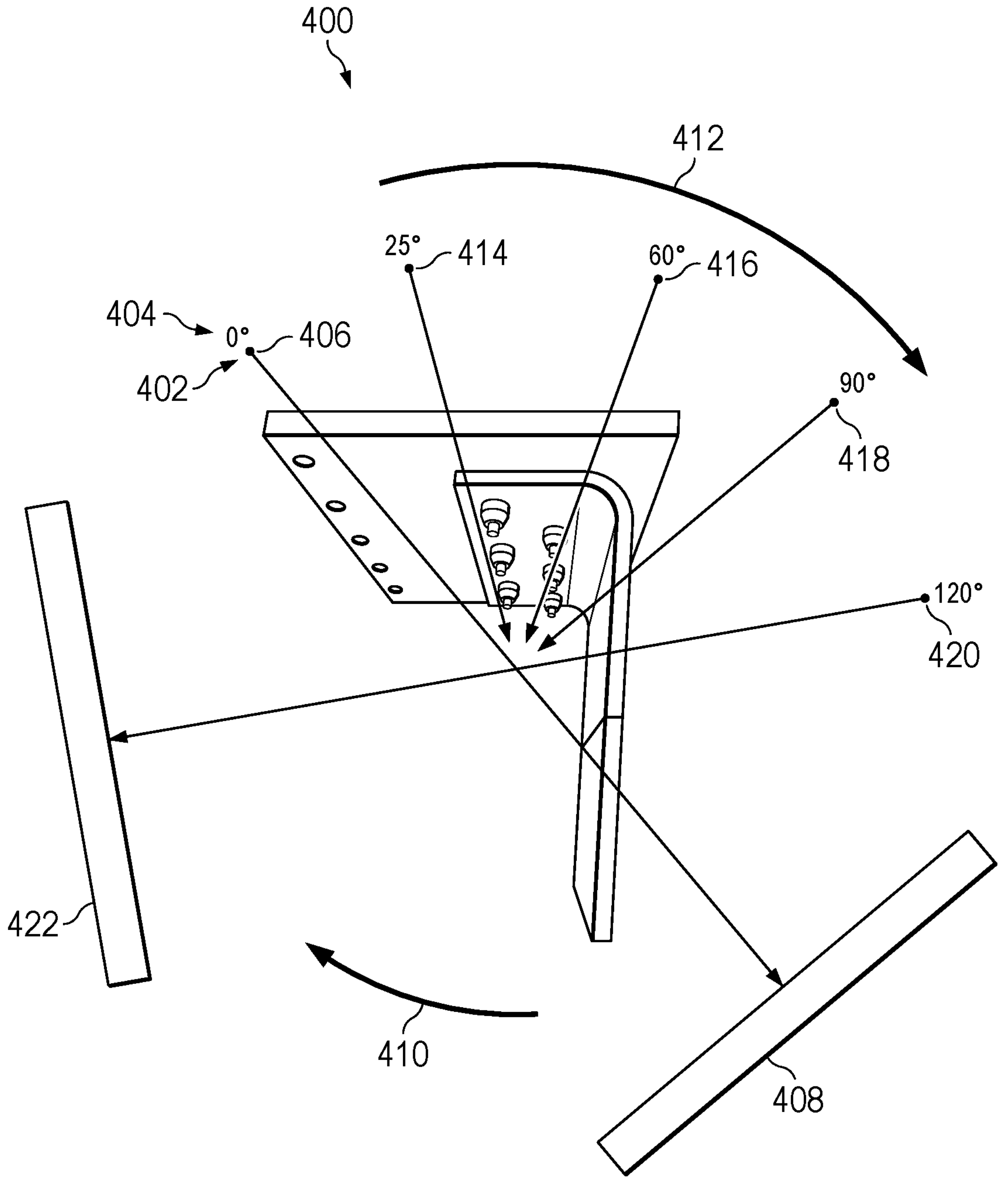
FIG. 4 is an illustration of a series of locations of an imaging system of a metrology supported tomography system in accordance with an illustrative embodiment.

Turning now to FIG. 4, an illustration of a series of locations of an imaging system of a metrology supported tomography system is depicted in accordance with an illustrative embodiment. View 400 is a view of locations 402 and scan angles 404. Locations 402 depicts a series of locations for a radiation source and a radiation detector for different scan angles. Initial source location 406 is a first position for the radiation source prior to moving in path 412 to perform an inspection of a workpiece. Initial detector location 408 is positioned to receive radiation from a radiation source at initial source location 406. The radiation detector is then moved in direction 410 to perform an inspection of the workpiece. The radiation detector stops at final position 422 to complete a scan angle of 120 degrees.

Locations 402 depicts a series of locations for a radiation source for different scan angles. Source location 414 depicts a final location for a radiation source for a 25-degree scan angle. Source location 416 depicts a final location for a radiation source for a 60-degree scan angle. Source location 418 depicts a final location for a radiation source for a 90-degree scan angle. Source location 420 depicts a final location for a radiation source for a 120-degree scan angle.

Figure 5:
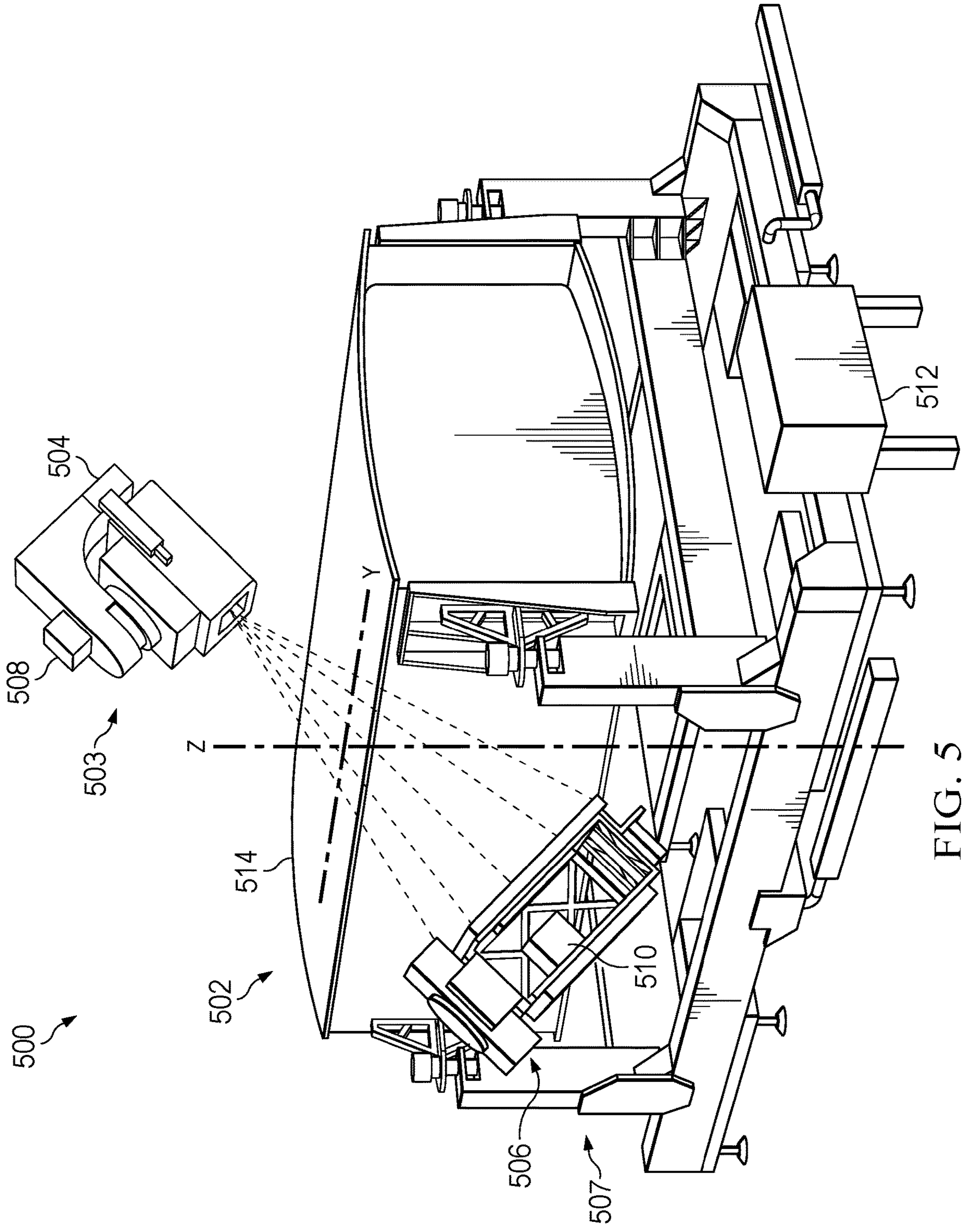
FIG. 5 is an illustration of a metrology supported tomography system and a workpiece in accordance with an illustrative embodiment.

Turning now to FIG. 5, an illustration of a metrology supported tomography system and a workpiece is depicted in accordance with an illustrative embodiment. Manufacturing environment 500 contains metrology supported tomography system 502. Metrology supported tomography system 502 comprises imaging system 503 and independent tracking system 507. Imaging system 503 comprises radiation source 504 and radiation detector 506. Although not depicted for ease of illustration, each of radiation source 504 and radiation detector 506 will be connected to a respective movement system.

Independent tracking system 507 determines locations of radiation source 504 and radiation detector 506 during inspection of workpiece 514. Independent tracking system 507 provides sufficient accuracy for location data to perform computed tomography scanning using less than 360 degrees of scanning angle to measure desired inconsistencies. Gaps in workpiece 514 are sufficiently small such that locating systems of movement systems would produce blurry reconstructions. Independent tracking system 507 provides sufficient accuracy for location data to create a three-dimensional reconstruction in which inconsistencies representing gaps of workpiece 514 can be located.

Workpiece 514 is oversized. In this illustrative example, workpiece 514 is oversized because workpiece 514 cannot be inspected by moving an inspection system completely around the workpiece. At least one of dimensions or design of workpiece 514 prevents traditional X-ray CT to be performed on workpiece 514.

Independent tracking system 507 is used to determine locations of radiation source 504 and radiation detector 506 within manufacturing environment 500. Data from independent tracking system 507 is used to determine positional data for generating a three-dimensional reconstruction for computed tomography scanning. Independent tracking system 507 comprises first tracking target 508 connected to radiation source 504, second tracking target 510 connected to radiation detector 506, and controller 512.

In this illustrative example, radiation source 504 and radiation detector 506 can be rotated about either Y-axis or Z-axis depicted in FIG. 5.

Figure 6:
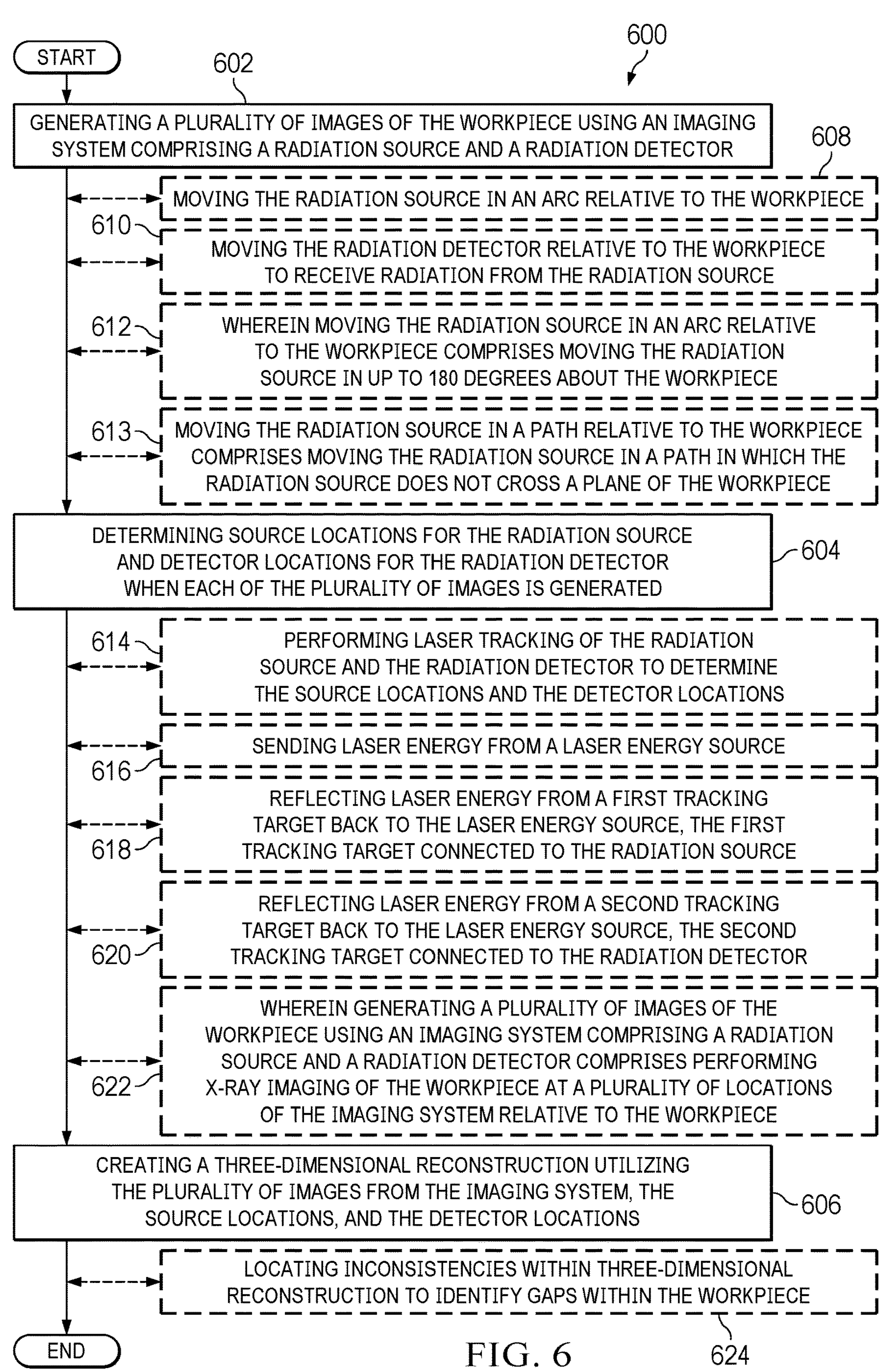
FIG. 6 is a flowchart of a method of inspecting a workpiece in accordance with an illustrative embodiment.

Turning now to FIG. 6, a flowchart of a method of inspecting a workpiece is depicted in accordance with an illustrative embodiment. Method 600 can be performed to inspect portions of aircraft 100 of FIG. 1 during manufacturing. Method 600 can be performed using metrology supported tomography system 202 to inspect inconsistencies, such as gaps 224, in workpiece 218 of FIG. 2. Method 600 can be performed by metrology supported tomography system 302 of FIG. 3. Method 600 can be performed by generating the plurality of images at any of scan angles 404 of FIG. 4. Method 600 can be used to inspect workpiece 514 using metrology supported tomography system 502.

Method 600 generates a plurality of images of the workpiece using an imaging system comprising a radiation source and a radiation detector (operation 602).

Method 600 determines source locations for the radiation source and detector locations for the radiation detector when each of the plurality of images is generated (operation 604). Method 600 creates a three-dimensional reconstruction utilizing the plurality of images from the imaging system, the source locations, and the detector locations (operation 606). The three-dimensional reconstruction is a three-dimensional reconstruction formed by joining the plurality of images from the imaging system. Afterwards, method 600 terminates.

In some illustrative examples, method 600 moves the radiation source in a path relative to the workpiece (operation 608). In some illustrative examples, method 600 moves the radiation detector relative to the workpiece to receive radiation from the radiation source (operation 610). In some illustrative examples, method 600 moves the radiation source and the radiation detector in non-traditional paths.

In some illustrative examples, moving the radiation source is done in an angle in less than 360 degrees about the workpiece. In some illustrative examples, moving the radiation source is done in an angle up to 180 degrees about the workpiece. In some illustrative examples, moving the radiation source in a path relative to the workpiece comprises moving the radiation source in up to 180 degrees about the workpiece (operation 612). In some illustrative examples, moving the radiation source in a path relative to the workpiece comprises moving the radiation source in up to 120 degrees about the workpiece.

In some illustrative examples, moving the radiation source in a path relative to the workpiece comprises moving the radiation source in a path in which the radiation source does not cross a plane of the workpiece (operation 613). In these illustrative examples, the radiation source and the radiation detector do not "swap" sides of a workpiece upon which they are located. In these illustrative examples, each of the radiation source and the radiation detector remain on a respective "side" of a plane.

In some illustrative examples, method 600 performs laser tracking of the radiation source and the radiation detector to determine the source locations and the detector locations (operation 614). In some illustrative examples, performing laser tracking comprises sending laser energy from a laser energy source (operation 616), reflecting laser energy from a first tracking target back to the laser energy source, the first tracking target connected to the radiation source (operation 618), and reflecting laser energy from a second tracking target back to the laser energy source, the second tracking target connected to the radiation detector (operation 620).

In some illustrative examples, generating a plurality of images of the workpiece using an imaging system comprising a radiation source and a radiation detector comprises performing X-ray imaging of the workpiece at a plurality of locations of the imaging system relative to the workpiece (operation 622). In these illustrative examples, the radiation source is an X-ray source.

In some illustrative examples, method 600 locates inconsistencies within three-dimensional reconstruction to identify gaps within the workpiece (operation 624). In some illustrative examples, inconsistencies include pixels with at least one of colors or intensities outside an anticipated pixel value.

As used herein, the phrase "at least one of," when used with a list of items, means different combinations of one or more of the listed items may be used and only one of each item in the list may be needed. For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A; one of item B; and ten of item C; four of item B and seven of item C; or other suitable combinations. The item may be a particular object, thing, or a category. In other words, at least one of means any combination items and number of items may be used from the list but not all of the items in the list are required.

As used herein, "a number of," when used with reference to items means one or more items.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram. Some blocks may be optional. For example, operation 608 through operation 622 may be optional.

Figures 7, 8:
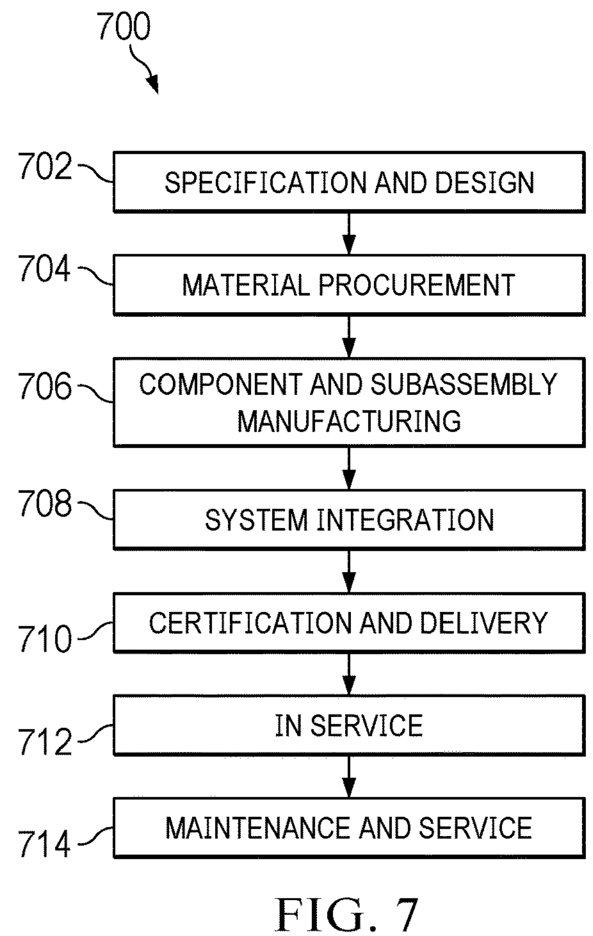
FIG. 7 is an illustration of an aircraft manufacturing and service method in a form of a block diagram in accordance with an illustrative embodiment.
FIG. 8 is an illustration of an aircraft in a form of a block diagram in which an illustrative embodiment may be implemented.

Illustrative embodiments of the present disclosure may be described in the context of aircraft manufacturing and service method 700 as shown in FIG. 7 and aircraft 800 as shown in FIG. 8. Turning first to FIG. 7, an illustration of an aircraft manufacturing and service method in a form of a block diagram is depicted in accordance with an illustrative embodiment. During pre-production, aircraft manufacturing and service method 700 may include specification and design 702 of aircraft 800 in FIG. 8 and material procurement 704.

During production, component and subassembly manufacturing 706 and system integration 708 of aircraft 800 takes place. Thereafter, aircraft 800 may go through certification and delivery 710 in order to be placed in service 712. While in service 712 by a customer, aircraft 800 is scheduled for routine maintenance and service 714, which may include modification, reconfiguration, refurbishment, or other maintenance and service.

Each of the processes of aircraft manufacturing and service method 700 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 8, an illustration of an aircraft in a form of a block diagram is depicted in which an illustrative embodiment may be implemented. In this example, aircraft 800 is produced by aircraft manufacturing and service method 700 of FIG. 7 and may include airframe 802 with plurality of systems 804 and interior 806. Examples of systems 804 include one or more of propulsion system 808, electrical system 810, hydraulic system 812, and environmental system 814. Any number of other systems may be included.

Apparatuses and methods embodied herein may be employed during at least one of the stages of aircraft manufacturing and service method 700. One or more illustrative embodiments may be manufactured or used during at least one of component and subassembly manufacturing 706, system integration 708, in service 712, or maintenance and service 714 of FIG. 7.

The illustrative examples present a metrology supported tomography system that utilizes a robotically driven imaging system to inspect a workpiece. In some illustrative examples, the imaging system is an X-ray system such that the metrology support tomography system is a metrology supported generalized tomography x-ray system utilizing a robotically driven x-ray system to measure gaps and other anomalies in large workpieces, such as aerospace structures. Two robots move synchronously to position a radiation source and detector panel about a workpiece. A metrology system is used to measure positions of the radiation source and detector panel to provide a more accurate position values for 3D reconstruction of the images. In some illustrative examples, the metrology system is a laser tracking system.

Three-dimensional images are reconstructed from the acquired images measurements and geometry information of the system components. Traditional CT requires 360 degrees of rotation, which is not often possible for large aerospace structures. The illustrative examples overcome the limitation of 360 degrees through the use of desirably accurate tracking using the independent tracking system.

Two robots are moved to position a radiation source and detector panel. A metrology system is used to determine the actual positions of these components, rather than relying on the predicted positions provided by the robots. Robot predicted positions are not accurate enough to reconstruct accurate images for inspection of large workpieces or inspection along non-traditional trajectories. In some illustrative examples, the metrology system is a laser tracker metrology system. This metrology system ensures desirably accurate position data is available for image reconstruction, which may be particularly important since only a limited angle of images are available due to at least one of the dimensions or shape of the workpiece.

The positioning of the radiation source and radiation detector can take non-traditional trajectories and is only limited by preventing trajectories that would create collision of the robots into the workpiece. Typical trajectories are circular, helical, or in a planar motion.

In some illustrative examples, large, powerful radiation sources are used for inspecting larger aerospace structures. The illustrative examples utilize movement systems configured to accommodate the large workpieces. In some illustrative examples, large industrial robots are used to accommodate the large workpieces. In some illustrative examples, the movement systems are also configured to accommodate the large powerful radiation sources. Additionally, the illustrative examples are calibrated with a metrology system, where conventional CT scanning can use calibration artifacts for the x-ray imaging software.

The illustrative examples provide the ability to produce three-dimensional reconstructions from non-traditional x-ray trajectories. The ability to produce these three-dimensional reconstructions is partially enabled with improved position data from metrology data.

The illustrative examples can be used to inspect large workpieces and workpieces using non-traditional paths. The illustrative examples can be used to inspect gaps between large joins in wings and fuselages, as well as smaller join areas. It may also be used to inspect smaller wing boxes that do not have access for manual visual inspection.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A metrology supported tomography system that comprises:
- a radiation source connected to a first robot configured to move the radiation source in a trajectory of less than 360 degrees around a part of an aircraft, wherein the radiation source comprises a size and a power sufficient to radiate joints within the part;
- a first tracking target connected to the radiation source;
- a radiation detector connected to a second robot configured to move in coordination with the radiation source;
- a second tracking target connected to the radiation detector;
- an independent tracking system configured to track locations of the first tracking target and the second tracking target; and
- a tomography computational program in a computer system configured to filter detected radiation, coordinate with data from the independent tracking system, and create a three-dimensional reconstruction of the part.

2. The metrology supported tomography system of claim 1, wherein:
- the tomography computation program is further configured to filter noise, differentiate gaps, and enhance edges in the three-dimensional reconstruction; and
- the trajectory is 180 degrees or less.

3. The metrology supported tomography system of claim 1, wherein:
- the trajectory is 120 degrees or less;
- the part is a wing of the aircraft; and
- the radiation source is an x-ray source.

4. The metrology supported tomography system of claim 1, wherein;
- the first robot and the second robot are configured to stay on opposite sides of the aircraft; and
- the first tracking target is a reflector.

5. The metrology supported tomography system of claim 1, wherein;
- the tomography computation program is further configured to locate inconsistencies within the three-dimensional reconstruction that identify gaps within the aircraft; and
- the independent tracking system is a laser tracking system.

6. The metrology supported tomography system of claim 1, wherein the independent tracking system is an optical tracking system.

7. The metrology supported tomography system of claim 1, wherein:
- the trajectory is: non-circular, non-planar, and non-helical; and
- the first tracking target and the second tracking target are both passive.

8. The metrology supported tomography system of claim 1, wherein:
- the tomography computation program is further configured to locate inconsistencies within the three-dimensional reconstruction that identify gaps within the aircraft based upon pixels in images of detected radiation being comprising values outside of an anticipated value of color or intensity; and
- the independent tracking system has an accuracy greater than respective locating systems of the first robot and the second robot.

9. A metrology supported tomography system that comprises:
- an imaging system comprising a radiation source and a radiation detector, wherein the radiation source is connected to a robot configured to move the radiation source in a trajectory of less than 360 degrees around a part of an aircraft and comprises a size and a power sufficient to radiate joints within the part;
- an independent tracking system comprising a first tracking target connected to the radiation source and a second tracking target connected to the radiation detector; and
- a tomography computation program configured to:
  - filter detected radiation; and
  - create a three-dimensional reconstruction utilizing data from the imaging system in combination with locations of the first tracking target and the second tracking target determined by the independent tracking system.

10. The metrology supported tomography system of claim 9, further comprising a second robot connected to the radiation detector.

11. The metrology supported tomography system of claim 10, wherein:
- the tomography computation program is further configured to filter noise, differentiate gaps, and enhance edges in the three-dimensional reconstruction; and
- an accuracy of the independent tracking system is greater than an accuracy of locating systems of the robot and the second robot.

12. The metrology supported tomography system of claim 9, wherein:
- the trajectory is less than 180 degrees; and
- the independent tracking system is a laser tracking system.

13. The metrology supported tomography system of claim 9, wherein:
- the tomography computation program is further configured to locate inconsistencies within the three-dimensional reconstruction that identify gaps within the aircraft; and
- the imaging system is an X-ray imaging system.

14. The metrology supported tomography system of claim 9, wherein;
- the trajectory is non-planar and non-helical; and
- the first tracking target and the second tracking target are active.

15. A method of inspecting an aircraft, the method comprising:
- moving a robot connected to a radiation source in a trajectory of less than 360 degrees around a part of an aircraft, the radiation source comprising a size and a power sufficient for radiating joints within the part;
- generating images of the aircraft using an imaging system comprising the radiation source and a radiation detector;
- determining, using an independent tracking system, source locations for the radiation source and detector locations for the radiation detector when each of the images is generated; and a tomography computational program in a computer system filtering detected radiation, coordinating with data from the independent tracking system, and creating a three-dimensional reconstruction utilizing the images from the imaging system, the source locations, and the detector locations.

16. The method of claim 15, further comprising the tomography computation program: filtering noise, differentiating gaps within the aircraft, and enhancing edges in the three-dimensional reconstruction.

17. The method of claim 15, further comprising:

the trajectory being less than 120 degrees; and moving the radiation detector relative to the aircraft and receiving radiation from the radiation source.

18. The method of claim 17, wherein the trajectory is up to 180 degrees about the aircraft.

19. The method of claim 17, wherein the trajectory is non-planar and non-helical and remains on one side of the aircraft.

20. The method of claim 15, further comprising:

performing laser tracking of the radiation source and the radiation detector and determining the source locations and the detector locations.

21. The method of claim 20, wherein performing laser tracking comprises:

sending laser energy from a laser energy source;

reflecting laser energy from a first tracking target back to the laser energy source, the first tracking target connected to the radiation source; and reflecting laser energy from a second tracking target back to the laser energy source, the second tracking target connected to the radiation detector.

22. The method of claim 15, further comprising:

locating inconsistencies, using the tomography computation program, within the three-dimensional reconstruction identifying gaps within the aircraft based upon pixels in the images comprising values outside of an anticipated value of color or intensity; and performing X-ray imaging of the aircraft at a plurality of locations of the imaging system relative to the aircraft.

* * * * *